United States Patent [19]
Chandler et al.

[11] Patent Number: 5,147,530
[45] Date of Patent: Sep. 15, 1992

[54] WELL WATER REMOVAL AND TREATMENT SYSTEM

[75] Inventors: James W. Chandler; William D. Chandler, Jr.; William J. Conery, all of Ashland, Ohio

[73] Assignee: Water Soft Inc., Ashland, Ohio

[21] Appl. No.: 271,349

[22] Filed: Nov. 10, 1988

[51] Int. Cl.$^5$ .................................................. C02F 1/52
[52] U.S. Cl. ................................ 210/90; 166/68.5; 210/117; 210/137; 210/170; 210/197; 210/199; 210/202; 210/218; 210/258; 210/277; 210/416.3; 251/61.3; 251/282; 417/80
[58] Field of Search .................... 166/68, 68.5; 210/90, 210/117, 130, 137, 170, 195.1, 197, 199, 201–203, 205, 206, 218, 258, 416.3, 277; 261/DIG. 75; 251/61.2, 61.3, 282; 417/79, 80, 87

[56] References Cited

U.S. PATENT DOCUMENTS

| | | | |
|---|---|---|---|
| 1,939,150 | 12/1933 | Terry | 251/61.3 |
| 2,237,882 | 4/1941 | Lawlor et al. | 210/722 |
| 2,303,627 | 12/1942 | Fuller | 417/80 |
| 2,416,345 | 2/1947 | Piccardo | 417/80 |
| 2,783,020 | 2/1957 | Kleczek | 251/282 |
| 3,161,140 | 12/1964 | Bloudoff | 166/68 |
| 3,177,892 | 4/1965 | Grandstaff | 251/282 |
| 3,325,014 | 6/1967 | Williamson | 210/199 |
| 3,649,532 | 3/1972 | McLean | 210/718 |
| 4,308,138 | 12/1981 | Woltman | 261/DIG. 75 |
| 4,430,228 | 2/1984 | Paterson | 210/665 |
| 4,478,765 | 10/1984 | Tubbs | 210/170 |
| 4,487,553 | 12/1984 | Nagata | 261/DIG. 75 |
| 4,543,186 | 9/1985 | Weisenbarger et al. | 210/170 |
| 4,603,735 | 8/1986 | Black | 166/68 |
| 4,659,463 | 4/1987 | Chandler et al. | 210/202 |

Primary Examiner—Peter Hruskoci
Attorney, Agent, or Firm—Calfee, Halter & Griswold

[57] ABSTRACT

The well water removal and treatment system of the present invention includes a pumping and well water withdrawl loop consisting of an above ground pump, a pressurized water drive line from the pump outlet to a well water ejector, a water return line from the well water ejector to an aeration and precipitation tank, an inlet line from the aeration and precipitation tank to the pump and a venturi nozzle air mixing manifold fluidically connected between the high pressure drive water line and the lower pressure water delivery line to mix air into the water during the entire pump cycle. The water delivery line from the pumping and withdrawal loop has a flow control regulator therein that controls the water flow therethrough in proportion to the water pressure in the pumping and withdrawal loop above a preselected minimum control level. Until the water pressure exceeds the minimum control level, the water repeatedly cycles through the pumping and withdrawal loop and thereafter most of the water repeatedly cycles through the loop until the pump is deactuated.

59 Claims, 6 Drawing Sheets

WELL WATER REMOVAL AND TREATMENT SYSTEM

This is a continuation of Ser. No. 06/908,261 filed on Sep. 17, 1986, now abandoned.

FIELD OF THE INVENTION

The present invention generally relates to a well water removal and treatment system and specifically relates to a well water removal and treatment system having a pumping and withdrawal loop including a pump motor with multi-stage pump end and a venturi nozzle mixing assembly continually to entrain air into the water during the entire pumping cycle.

BACKGROUND OF THE INVENTION

Well water is normally drawn out of the well by using a system including either a jet pump motor with impeller above ground or by using a system including a submersible pump motor and staged submersible pump end.

In the jet pump system, the jet pump motor with impeller is above the ground and is creating suction to draw water upwardly from the well through the jet pump impeller. Most of the water leaving the jet pump is recirculated back into the well through a well water ejector to help in drawing the water from the well. The rest of the water leaving the jet pump impeller is delivered to the water service system.

The maximum theoretical efficiency for a jet pump system is approximately 30%. However, the majority of the jet pump well systems operate in an efficiency range between 15% and 20%. The jet pump system is less expensive and easier to maintain than the submersible pump.

In a submersible pump system, the pump motor, screened inlet and submersible pump end are positioned in the well casing below the water level. The submersible pump end has plural stages to develop high water pressures of 100 to 120 psi to create a strong pressure effect and to forcibly direct the water upwardly out of the well. Submersible pumps operate at higher efficiencies, for example in the efficiency range of 40 to 60%, but are subject to other disadvantages.

For example, submersible pumps are more expensive than jet pumps. Also, submersible pumps are subject to additional operational problems, increased maintenance and increased expenses due to their submerged position in the well casing and due to particulate materials in the well water.

These jet pumps and submersible pumps have been used in systems to remove contaminants by filtering the raw well water. Two systems removing well water contaminants by filtration are disclosed in McLean U.S. Pat. No. 3,649,532 and in Patterson U.S. Pat. No. 4,430,228.

In the McLean patent, the pumped well water passes through a venturi type apparatus to entrain air into the water, and this air laden water is then introduced into a filter tank containing a filter bed. The air intake at McLean's venturi is limited so as not to oxidize the iron contained in the water before it enters the filtration bed. This filtration bed slowly raises the pH of the water passing therethrough while oxidizing and filtering the iron hydroxide and other impurities therefrom. The single filtration tank McLean system has an air inlet that must be closely controlled to avoid oxidation of the contaminants until the water enters the filter bed.

The Patterson patent also includes using an air injector to introduce air in controlled quantities to form colloidal iron compounds in the water in the form of invisible sols having charged micelles. The water with colloidalized iron having charged micelles is passed through filter tank particulate material having opposite surface charges capable of attracting, removing and collecting the dispersed iron hydrate cells. The Patterson patent thus teaches closely controlling the injection of air to create colloidalized, electrostatically charged, hydrated micelles which are removed in a single filter tank having a specialized media bed preconditioned at the factory to have an opposite electrostatic charge.

To improve upon the single tank filtering systems with closely controlled, limited air inputs, two of the inventors of the present application developed a system entraining substantially more air than required for oxidation purposes and employing an aeration and precipitation tank in addition to a filter tank. This improved system is disclosed and claimed in Chandler application Ser. No. 659,327 which was filed on Oct. 10, 1984 now U.S. Pat. No. 4,659,463 and is assigned to the assignee of the present invention. The systems utilizing the invention disclosed in the Chandler application have improved the quality of water delivered to service when satisfactory operating conditions exist.

In this regard, in order to entrain excess air substantially to oxidize the contaminants, a pressure differential of at least 15 psi across the venturi nozzle is required. When the Chandler system is retrofit into a jet pump system, the required pressure differential across the air intake manifold assembly may not always be enough to entrain sufficient excess quantities of air. In such a situation, the jet pump could be replaced by a relatively expensive submersible pump having the operational and maintenance problems involved with submersion in well water. With either type of pump, all the excess air had to be entrained in one pass through the air mixing manifold and aeration and precipitation tank. While one pass normally provides satisfactory results, certain water conditions may exist where water quality could be enhanced by additional air exposure with resultant additional oxidation of contaminants contained therein.

Moreover, certain abnormal operating conditions can exist which are detrimental to the McLean, Paterson or Chandler well water systems employing either type of pump. For example, if a faucet is inadvertently left on in the house, the water continuously delivered to the house may exceed the capacity of the system to withdraw water from the well, particularly in a weak well situation. When this happens in a jet pump system, the pump loses its prime, which at best requires the system to be reprimed and restarted and which at worst results in pump motor or impeller damage. When this happens with a submersible pump system, the submersible pump, if equipped with valve or switch safeguards, will shut off requiring restarting. If the submersible pump is not equipped with safeguards or they fail, the submersible pump ultimately would no longer be submerged and could experience air locking or pump damage.

SUMMARY OF THE PRESENT INVENTION

In view of the above, the principal object of the present invention is to provide a water removal and treatment system wherein the well water is repeatedly exposed to excess air in a pumping and withdrawal loop.

The loop includes the pump, water drive line, ejector, water return line, aeration and precipitation tank, pump inlet line and air inlet manifold. The aeration and precipitation tank separates excess air and gases from the water so that the water returning to the pump through the inlet line has very little air, if any, entrained therein. Therefore, even if a faucet is left on, the pump will only see water being continuously recycled in the loop to avoid system damage.

It is another object of the present invention to position the air mixing manifold in the withdrawal and pumping loop to provide a large pressure differential across the manifold continuously to entrain excess air while the water repeatedly cycles within the loop. To this end, the air mixing manifold is positioned between the drive line leading from the pump to the well ejector and the return line from the well to the aeration and precipitation tank.

It is still another object of the present invention to control the water being delivered from the loop to filtration and service in proportion to the pressure on the side of the loop returning from the well. A hydraulic flow control regulator is inserted in the delivery line from the loop and is controlled progressively to open when the pressure on the return side of the loop exceeds a predetermined minimum level. When the loop pressure decreases below the predetermined control level, the regulator automatically closes to block the delivery line. Thus, if a faucet is left on in a weak well situation, the pump loop pressure will decrease resulting in the regulator automatically closing to stop water delivery and to repeatedly cycle the water in the closed loop until sufficient pressure is reattained in the loop.

It is yet another object of the present invention to provide a high pressure system operative to enhance contaminant removal, to provide high system pressure for water delivery and to improve installation and maintenance factors. This object is accomplished by having all system components other than the ejector above ground, by utilizing a pumping loop incorporating a jet pump motor with a multi-stage pump end, by entraining air in excess quantities into the water as it repeatedly cycles through the loop and by utilizing a high pressure air head to control both water delivery to service and pump actuation. The pump, aeration and precipitation tank, pressure tank and filter tank may be included in a pump house or in a basement substantially to reduce outdoor installation and servicing problems encountered particularly in the winter.

Another object of the present invention is to provide a properly selected and installed system that requires no adjustments or regulations of the system either in installation or during normal operation. The pumping and withdrawal loop, the flow control regulator, the pressure vessel switch controls and a control valve on the filter tank provide automatic, long term operating capability when the system components are properly matched with one another, with the well and with service requirements.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE PREFERRED EMBODIMENTS

The embodiments of the present invention all preferably include a pumping and withdrawal loop, an air mixing manifold between the water drive line and water return line and a hydraulic flow control regulator in the water delivery line to service controlled by loop water pressure. These basic system components can be incorporated in one system embodiment utilizing the aeration and precipitation tank as the air pressure control or in a second preferred system embodiment incorporating an additional pressure tank as the air pressure control. These basic components can also be retrofit into an existing jet pump well system. These exemplary embodiments and retrofit embodiment are described in detail below.

FIRST EMBODIMENT

Figure 1:
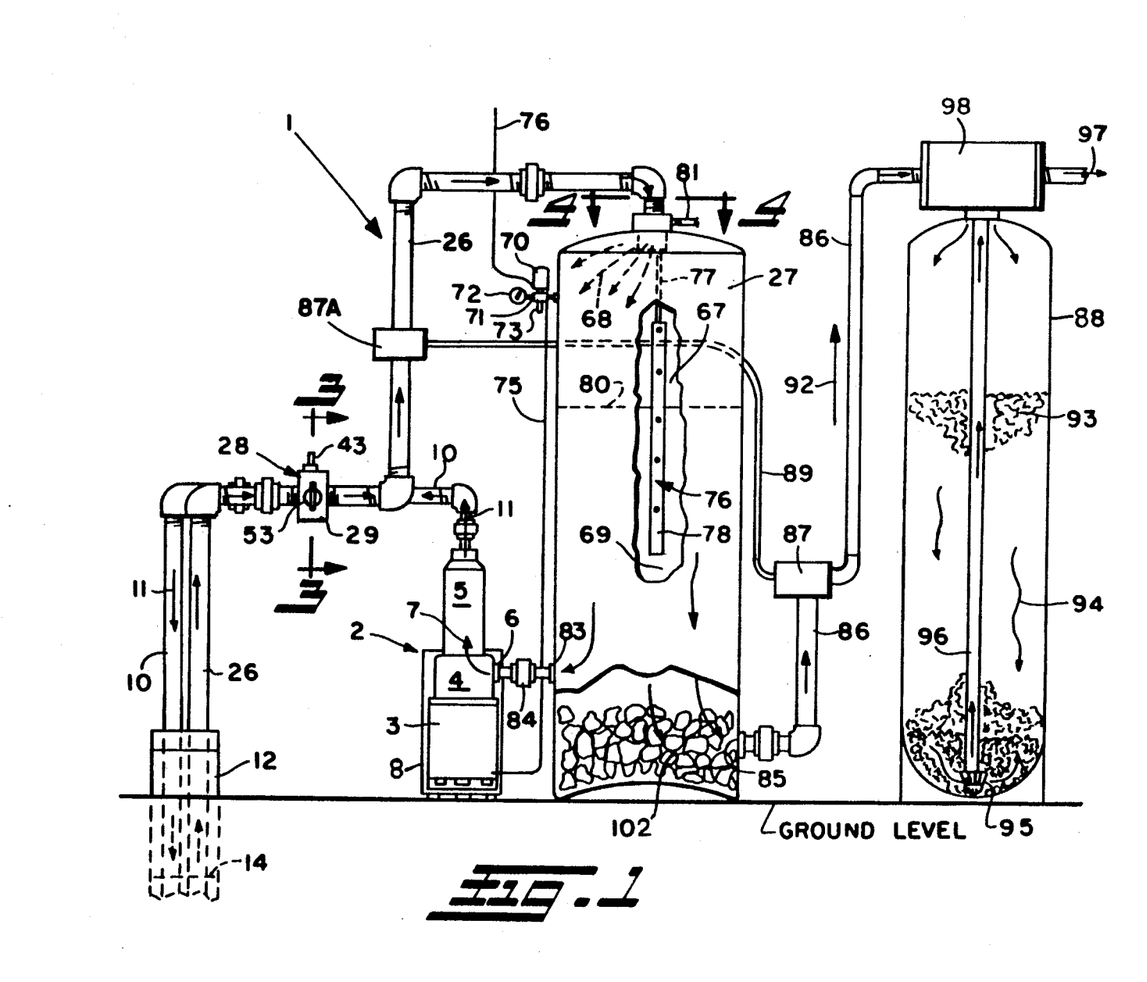
FIG. 1 is an elevation of one embodiment of the well water removal and treatment system of the present invention partially broken away for clarity of illustration, with the arrows schematically indicating direction of water flow.

Turning now in more detail to the drawings and initially to FIG. 1, the well water removal and treatment system of the first embodiment of the present invention, indicated generally at 1, includes a pump assembly, indicated generally at 2. The pump assembly 2 includes a jet pump motor 3, a pump adaptor manifold 4 and a multi-stage pump end 5. The pump adaptor manifold 4 has a water intake 6 to allow the water to enter and pass upwardly through the pump end 5 for pressurization as schematically indicated by the arrow 7. A pump stand 8 is provided to allow vertical adjustment of the pump assembly 2 according to the motor size being used to provide proper alignment for associated piping. Although various size jet pump motors and multi-stage pump ends may be used in the system depending upon well depth and service capacity required, a 1½ horsepower jet pump motor and an eight stage pump end are preferred for a seven gallon per minute service capacity system with a dynamic pumping level in the well of approximately 125 feet or less. If the dynamic pumping level is between 125 feet and 250 feet, a 2 HP motor and an 11 stage pump end are preferred readily to provide the net lift required and the 7 gpm service capacity.

The water leaving the discharge port of pump end 5 at a pressure preferably ranging between 90 psi and 140 psi passes into and through pressurized water drive line 10, as schematically indicated by arrows 11. As shown in FIG. 1, the pressurized water drive line 10 extends from pump end 5 into well casing 12. A well water ejector 13 is positioned in the well casing 12 below the ground approximately ten to fifteen feet below the static water level 14 in the well.

Figure 2:
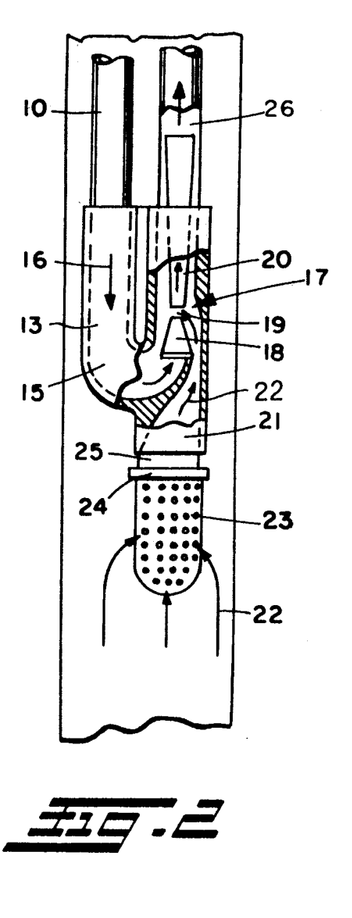
FIG. 2 is a fragmentary elevation showing the portion of the well casing containing the deep well water ejector, partially shown in section for clarity of illustration.

As best shown in FIG. 2, the submerged well water ejector 13 has the pressurized water drive line 10 connected thereto to direct pressurized water into the inlet side of the U-shaped conduit 15, as schematically indicated by arrow 16. The U-shape conduit 15 has a venturi nozzle, indicated generally at 17, mounted in its outlet side.

The venturi nozzle assembly 17 includes a converging section 18, a throat 19 and a diverging section 20. The pressurized water on the inlet side of the U-shaped conduit 15 of the deep well ejector 13 moves through the venturi nozzle assembly 17 by passing through converging section 18, throat 19 and diverging section 20. This water movement through venturi nozzle 17 increases water velocity and decreases water pressure, which in conjunction with the differential pressure between the pump and return side of the system loop, creates a vacuum effect drawing well water upwardly from the well through the withdrawal line 21 into the throat 19 of venturi assembly, as schematically indicated by the arrows 22. The withdrawal line 21 has a bottom screen filter 23 thereon to keep sediment and debris in the well water from passing into the deep well ejector 13. The foot valve 24 and an additional check valve 25 can be inserted into withdrawal line 21 to retain the system water within the system.

Preferably, approximately 20 gallons of water per minute are pumped through the pressurized water drive line into the well. Although some pressure is lost in the drive line, the water passing through deep well ejector 13 is still at high pressure, preferably over a 100 psi. The high pressure water passing through and around venturi nozzle assembly 17 enhances the suction created to provide a secondary pumping effect to draw approximately 7 gallons of water per minute from the well.

Figure 6:
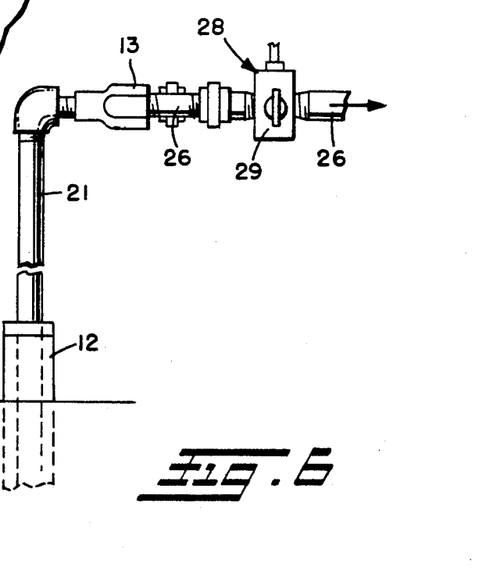
FIG. 6 is a partial elevation showing a well water ejector above ground for a shallow water well.

For shallow wells, the well water ejector 13 can be positioned above ground as shown in FIG. 6. The well water withdrawal line 21 extends upwardly out of well casing 12 to its connection with shallow well ejector 13.

For both shallow and deep wells, the system water and water withdrawn from the well leave the ejector under the pressure and velocity created by the pump 2 and by the secondary pumping effect of the ejector 13. For this purpose, a water return line 26 is connected to the well water ejector outlet and extends upwardly out of the well casing 12. Although drive line 10 and return line 26 are shown as spacially separated, the present invention can also use concentric piping for lines 10 and 26 in a packer fitting and ejector when the well casing is of smaller diameter. The term ejector as used herein encompasses, but is not limited to, deep well ejectors, shallow well ejectors and packer ejectors. Deep well, shallow well and packer ejectors are commercially available from a number of suppliers including Goulds Pump Co., F. E. Myers, Flint & Walling and Red Jacket Pumps.

The water return line 26 has elbows and straight sections therein leading to the top of the aeration and precipitation tank 27. An air mixing manifold assembly, indicated generally at 28, is positioned between the pressurized water drive line 10 and the water return line 26 above ground level.

Figure 3:
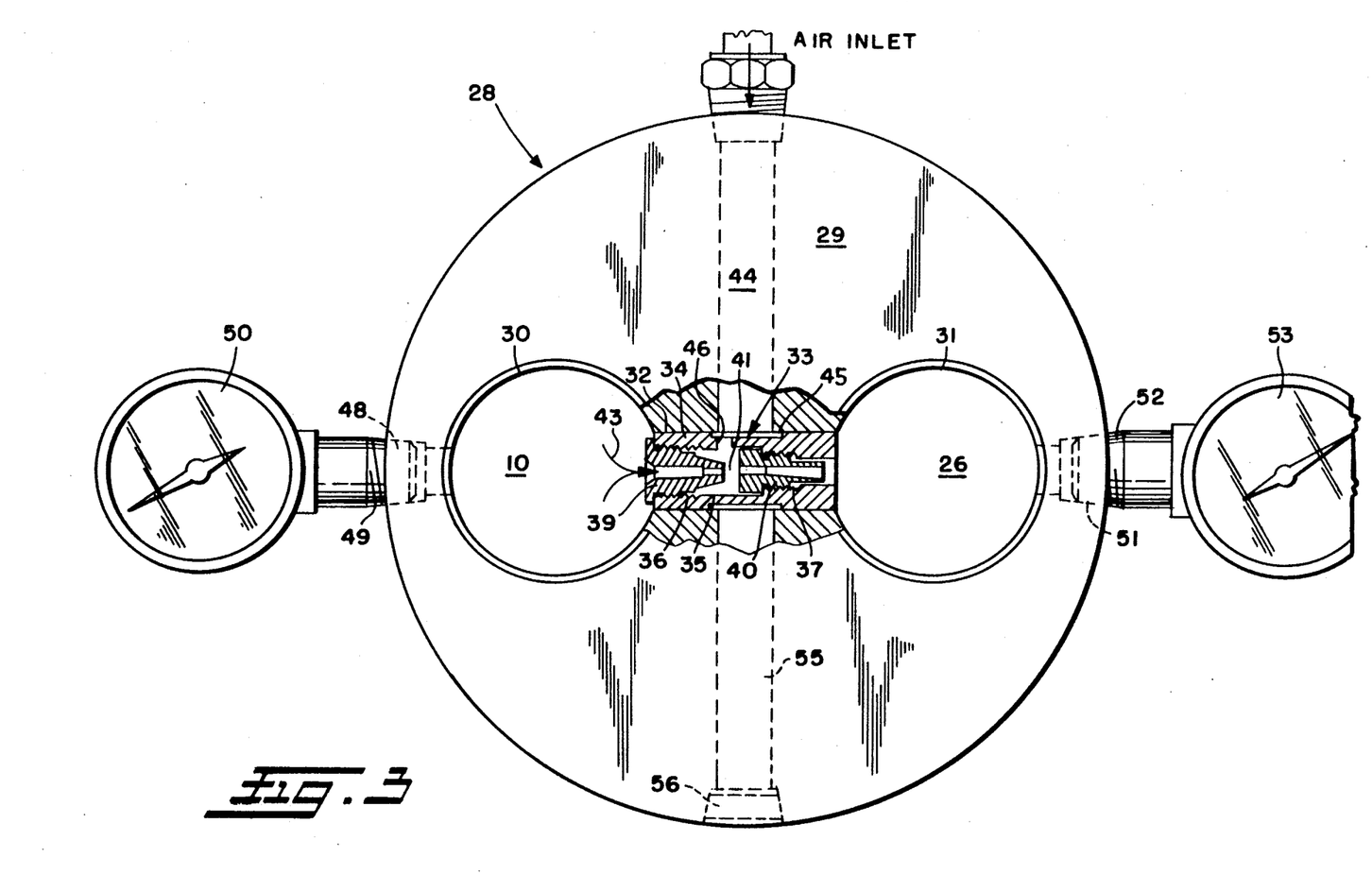
FIG. 3 is an elevation partially in section taken generally along the plane 3—3 of FIG. 1 showing a venturi nozzle air mixing assembly fluidically connecting the pressurized water drive line to the water return line.

As best shown in FIG. 3, the mixing manifold assembly 28 includes a body 29 having two parallel bores 30 and 31 passing therethrough. Bore 30 has the water drive line 10 passing therethrough, and the bore 31 has the water return line 26 passing therethrough. A third bore 32 of smaller diameter is at right angles to bores 30 and 31 and interconnects the same. The third bore 32 has a venturi nozzle assembly indicated generally at 33 mounted therein.

The venturi nozzle assembly 33 includes an insert body 34 mounted in the third bore 32 and axially coextensive therewith. The insert body 34 has a stepped passage 35 therethrough with two spacially separated female thread sections 36 and 37 thereon. The thread section 36 threadably mounts a converging passage component 39. The thread section 37 threadably mounts a diverging venturi nozzle component 40 in the stepped passage 35 of insert 34. Converging passage component 39 and diverging passage component 40 are axially separated from one another as shown in FIG. 3 to form a throat 41 therebetween. A portion of the pressurized water passing through pressurized water drive line 10 is diverted through the venturi nozzle 33, as schematically illustrated by arrow 43.

With the preferred system described, approximately one gallon per minute of water passes through the converging passage component 39, throat 41 and diverging passage component 40. This water movement through venturi nozzle 33 increases water velocity and decreases water pressure to create a vacuum effect in conjunction with the pressure differential across mixing manifold assembly 28. This vacuum effect draws air through a Schrader valve 43 and air bore 44 in body 29 into throat 41. For air passage into the throat, the insert 34 is provided with an annular groove 45 in its outer diameter, which groove communicates with inlet port 46 leading to throat 41.

The water in water return line 26 passing through bore 31 will have a preferred pressure in an approximate range between 60 and 80 psi. A pressure differential of approximately 30–60 psi is thus present across the mixing assembly 28. A pressure differential of only 15 psi across the mixing assembly is required to draw air, and thus the mixing assembly of the present invention will draw substantial quantities of air during the entire pump cycle.

The air is mixed into the water by its movement through diverging passage component 40 and by its right angle entry into the water passing through water return line 26. The venturi nozzle assembly 33 and its air intake are designed to entrain as much air as possible in the water to make sure sufficient oxygen exists in the water to obtain substantial oxidation of the contaminants contained in the water. The venturi nozzle assembly 33 is operative by entraining air to enhance oxidation of the contaminants in the water and to slightly increase the pressure differential between pressurized water drive line 10 and water return line 26.

This pressure differential across mixing manifold assembly 28 can be monitored by pressure gauges. As shown in FIG. 3, a threaded port 48 in body 29 communicates with pressurized water drive line 10. Threaded port 48 is normally closed by receiving the threaded shank 49 on pressure gauge 50. Similarly, a threaded port 51 in body 29 communicates with water return line 26. Port 51 receives the threaded shank 52 on pressure gauge 53. The pressure gauge 50 provides a reading of the water pressure in pressurized water drive line 10 at mixing manifold assembly 28, while pressure gauge 53 provides a reading of the water pressure in water return line 26 at mixing assembly 28. By comparing the respective pressure readings on gauges 50 and 53, the pressure differential across the mixing manifold assembly 28 between pressurized water circulation line 10 and water return line 26 can be readily determined and monitored.

The venturi nozzle 33 of the mixing assembly 28 is designed for easy assembly and maintenance. The ports 48 and 51 are diametrically opposed to one another and in straight line alignment with the stepped passage 35 through insert 34. By removing one or both of the pressure gauges, direct access is provided to insert 34 to permit converging passage component 39 and/or diverging component 40 to be threadedly removed from or inserted into stepped passage 35. A screen filter may also be positioned over the inlet to converging passage component 39 to block any particulate contaminants or debris in the water from passing through venturi nozzle 33.

The water being drawn from the well may include contaminants and/or a pH level requiring additional conditioning for service use. To this end, the body 29 of venturi mixing nozzle 28 may have additional bores therein to allow water treatment chemicals to be introduced into the water stream. As shown in FIG. 3, a bore 55 in body 29 communicates with the annular groove 45 on insert 34. The radially outer end of bore 55 is normally closed by a plug 56. When required by the condition of the water, the plug 56 can be removed and a source of the required water treatment chemical coupled thereto. The passage of water 43 through the venturi nozzle 33 and the pressure differential across the mixing manifold assembly 28 creates a vacuum effect drawing the water treatment chemical through bore 55, groove 45 and inlet port 46 into the throat 41 of the venturi passage. The water treatment chemical (for example, chlorine for infected wells or soda ash for extremely low pH wells) is thus injected into and mixed with the water in return line 26 leading to aeration and precipitation tank 27. Additional chemical treatment ports can be provided in body 29 to allow additional chemicals to be entrained in the water if required by the condition of the water being treated.

Figure 3A:
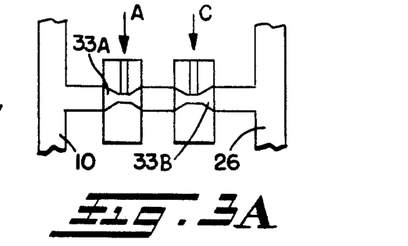
FIGS. 3A–3C are partial elevations schematically illustrating venturi entrainment of air and treatment chemicals into the water between the drive and return lines in series (FIG. 3A), in plural cross-overs (FIG. 3B) and in parallel (FIG. 3C)
Figure 3B:
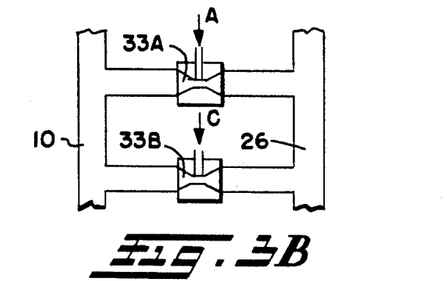
Figure 3C:
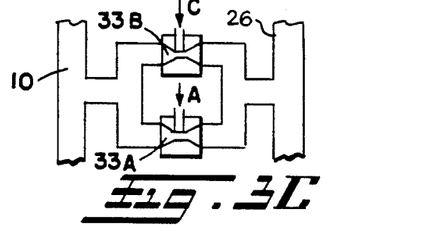

Alternatively, plural venturis can be utilized in series, in parallel, or in separate crossovers, with one venturi being dedicated to air and the additional venturi or venturis being dedicated to the chemical or chemicals required. As shown in FIG. 3A, venturi 33A for air entrainment (as represented by the arrow A) could be connected in series with venturi 33B for chemical entrainment (as represented by the arrow C) between the drive line 10 and return line 26. Alternatively, venturis 33A and 33B could be connected in separate crossovers as shown in FIG. 3B or in parallel as shown in FIG. 3C. Additional venturis could be employed in any arrangement between the drive and return lines if additional treatment chemicals are required by the well water being treated.

Figure 4:
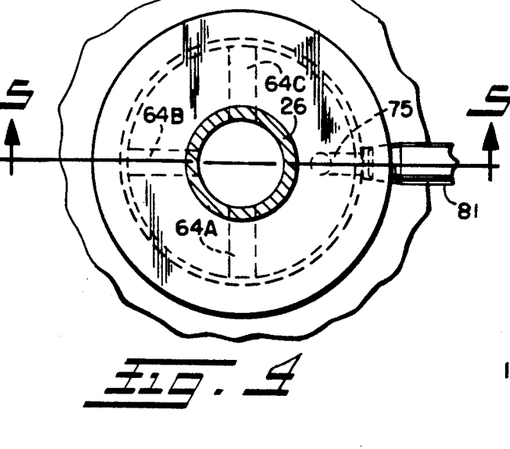
FIG. 4 is a section of the water inlet manifold assembly on the aeration and precipitation tank taken generally along the plane 4—4 in FIG. 1.
Figure 5:
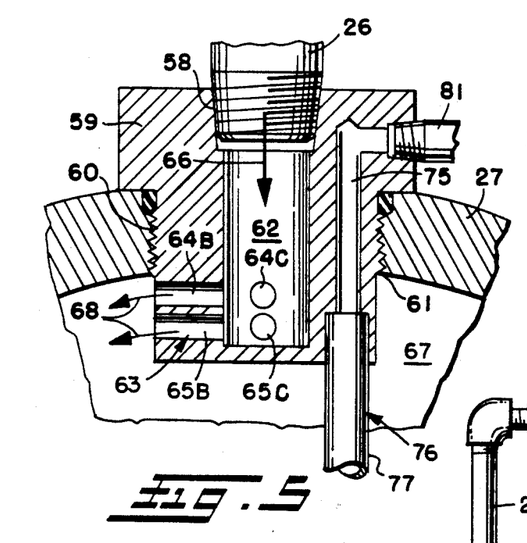
FIG. 5 is a section of the water inlet manifold assembly taken along the plane 5—5 of FIG. 4.

As best shown in FIGS. 1, 4 and 5, water return line 26 is threadedly connected to a threaded port 58 in inlet manifold 59 at the top of aeration and precipitation tank 27. The manifold 59 has a downwardly extending externally threaded flange 60. The external threads on flange 60 threadedly mate with female threads in the cylindrical opening 61 of aeration and precipitation tank 27, whereby inlet manifold 59 is removably mounted on tank 27. The manifold 59 has a blind end bore 62 extending into the flange portion 60 for communication with two vertically spaced nozzle arrays indicated generally at 63.

As shown in FIGS. 4 and 5, the first upper array of spray nozzles includes nozzles 64A, 64B and 64C, respectively separated from one another by 90° circumferential increments. A second lower array of three spray nozzles is vertically separated from and either directly below the first array as shown or circumferentially staggered from the first array. The second array of nozzles includes nozzles 65B, 65C, and a third nozzle (not shown), respectively separated from one another by 90° circumferential increments. The water passing from return line 26 into the blind end bore 62, as schematically indicated by arrow 66, divides for passage through nozzles 64A-C and 65A-C.

The water passing through the six nozzles in the two arrays is sprayed into air head 67 of tank 27. By employing six nozzles, the surface area of the water sprayed (as indicated by the arrows 68) is enlarged to increase its exposure to the oxygen contained in the air head 67. This oxygen exposure further enhances oxidation of the contaminants in the water to form precipitants therein. Further as a result of spraying the air laden water into tank 27, the entrained air and any residual non-oxidized gases in the water, such as $H_2S$, methane, natural gas or the like, are separated from the water resulting in a water column 69 in the bottom of tank 27 and the air head 67 in the top of tank 27. Air head 67 is under pressure and acts as the pressure head for the entire system.

The pressure in air head 67 is controlled for maintenance within a selected pressure range, for example between 40 psi and 60 psi. For this purpose, a pressure switch 70 is operatively connected to air head 67 by four way coupling 71. A pressure gauge 72 is also connected to one branch of the four way coupling 71 to display the system pressure existing in air head 67. A pressure release valve 73 is connected to another branch of the four way coupling 71 to vent air head 67 if an over pressurized condition exists.

The pressure switch 70 is electrically connected by wiring 75 to pump motor 3 and by wiring 76 to a power supply. When the pressure in air head 67 approaches the 40 psi lower limit, pressure switch 70 cuts in and is operative in the control circuit to turn on pump motor 3. The pump then continues to operate until the pressure in air head 67 builds up to approximately 60 psi when switch 70 cuts out and deactivates pump motor 3. The pump remains off until the pressure in air head 67 again approaches the lower limit of 40 psi resulting in reactuation. The pneumatic pressure control system for maintaining the pressure of air head 67 within the exemplary range specified has safety features to prevent over or under pressurization of the system.

To this end, pressure release valve 73 vents the air head 67 if the pressure builds up beyond a predetermined upper safety limit, for example 70 psi. At the other end of the range, pressure switch 70 has a low pressure safety cut off. If the pump is operating and the pressure air head 67 is decreasing, the switch 70 will turn off the pump motor 3 when the low limit safety cut off pressure, such as 30 psi, is reached. The safety features at both ends of the pressure control operating range are provided to avoid damage to the system components.

Air head 67 can also be vented through the intake manifold 59. As shown in FIGS. 1, 4 and 5, intake manifold 59 has an L-shape air release conduit 75 extending therethrough. A float valve assembly indicated generally at 76, is connected to and extends downwardly from intake manifold 59 in fluid communication with air release conduit 75. This float valve assembly 76 is disclosed in detail in copending and coassigned patent application Ser. No. 659,327, filed on Oct. 10, 1984, which is incorporated herein by reference thereto.

The float valve assembly 76 includes upper tubular extension 77 having cylindrical float guide 78 connected thereto and depending therefrom. The cylindrical float guide 78 has vertically spaced apertures 79 in the wall thereof. A float valve body is contained in cylindrical float guide 78 and is normally held against the upper end face thereof by its buoyancy in water column 69. By being held against the upper face, the float valve body closes off the upper tubular extension 77 thus precluding air from escaping air head 67 through tubular extension 77 and air release conduit 75. However, as the air and gas separated from the water build up in air head 67, the air and gas volume 67 in the tank increases to cause the water level of water column 69 to decrease slightly for very brief time increments.

When the water level 80 of water column 69 decreases, the float valve body bouyantly held in such water will similarly move briefly downwardly. The instantaneous downward float valve body movement results in the upper tubular extension 77 being briefly uncovered. The excess air and gases in air head 67 can then be vented to atmosphere by passing through upper tubular extension 77 and air exhaust conduit 75 in inlet manifold 59. The vented air and gas travels through a drain line 81 and vapor phase filter (not shown) to the atmosphere. When sufficient air and gas have been vented, the water level 80 in tank 27 again quickly rises to elevate the float valve therein into contact with the upper end face of cylindrical valve guide 78 to block upper tubular extension 77.

Adjacent the lower end of aeration and precipitation tank 27, a first outlet 83 is fluidically coupled to pump inlet line 84 leading to pump intake 6. Since air and other entrained gases are separated from the water in the aeration and precipitation tank 27, very little, if any, air will be entrained in the water returning to pump 2 through pump inlet line 84.

A second outlet 85 adjacent the bottom of aeration and precipitation tank 27 is coupled to water delivery line 86. A water flow regulator 87 is inserted in the water delivery line 86 to control the water flowing therethrough to filter tank 88. The water flow regulator 87 controls the flow of water through delivery line 86 in proportion to the water pressure on the return side of the pumping and withdrawal loop of the system.

The pumping and withdrawal loop of the system includes pump 2, drive line 10, well water ejector 13, return line 26, air mixing manifold 28, aeration and precipitation tank 27 and pump inlet line 84. The water pressure in the pumping loop can be sampled at any convenient point on the return side of the pumping and withdrawal loop. As shown for convenience in FIG. 1, the loop pressure is sampled from return line 26 as shown at 87A.

The pressure in return line 26 is monitored through the pressure detection line 89 extending between water return line 26 and flow control regulator 87. As the pressure in return line 26 exceeds a minimum control pressure, for example, approximately 7 psi, the water flow regulator 87 begins to open to pass water through delivery line 86. When the water pressure in the return line (or other return loop sampling point) equals or exceeds an upper preselected control pressure, for example, approximately 8 psi, the water flow regulator is in its fully open position allowing the full 7 gpm gallons per minute to be delivered upon demand to service. The structural and functional details of the water flow regulator 87 are described in more detail below in conjunction with the description of the preferred second embodiment.

Water flowing through water delivery line 86, as schematically shown by arrow 92, is sprayed into the top of filter tank 88. The water then passes downwardly through a filtration bed 93 as illustrated by arrows 94. Preferably, the filter bed 93 is of mixed materials. This preferred mixed media filtration bed is selected according to the water being treated and may include calcium carbonate to assist pH control, BIRM catalyst material sold by Clack Corporation to convert ferrous oxides to ferric hydroxides for precipitation and removal and non hydrous aluminum silicate material for filtration. The water upon reaching the bottom of the mixed media filter bed 93 passes upwardly through strainer basket 95 and riser tube 96. Water leaving riser tube 96 can selectively be delivered to service on demand as indicated by arrow 97.

The filter tank 88 is preferably provided with an automatic control valve 98, although a manual control valve could also be used. This control valve 98 has a means, such as a timer, periodically operative to reverse water flow through the filter tank for automatically backwashing the filter media bed. This control valve or similar type control valves are available from a number of suppliers, including L. W. Fleckenstein, Inc. By providing automatic backwashing, the system will periodically demand water from the pressure vessel and/or pumping and withdrawal loop to occasionally move water through the system even if the homeowner is away for extended periods of time.

Although the operation of the well water removal and treatment system of FIGS. 1-6 is believed apparent from the above, a brief operational statement is provided hereinafter for purposes of completeness.

During installation of the system, air head 67 of aeration and precipitation tank 27 may be precharged with compressed air at approximately 38 psi or at 2 psi below the switch cut-in setting. The pump, aeration and precipitation tank, air mixing manifold and filter can all be installed in a pump house or basement for ease of installation and subsequent maintenance.

After installation, flow control regulator 87 is in its closed position blocking water flow through water delivery line 86. To initiate operation, pump 2 is primed with approximately 5 gallons of water and then actuated. Pump 2 delivers prime water under high pressure sequentially through drive line 10 and well water ejector 13 to begin withdrawing water from the well. The system water and well water withdrawn then passes under pressure through return line 26, aeration and precipitation tank 27 and inlet line 84 to the pump intake 6 to complete the pumping and withdrawal loop. The system water and water withdrawn are repeatedly cycled through the pumping and withdrawal loop until sufficient water pressure is obtained in the loop as monitored, for example, in water return line 26. During the entire pumping cycle, air is being entrained in the circulating water through the air mixing manifold assembly 28. The pressure differential between the water drive line 10 and water return line 26 assures that air will be entrained into the water during the entire pumping cycle to enhance oxidation of the contaminants contained therein for removal in the aeration and precipitation tank 27 and/or filter tank 88.

Water will normally cycle through the pumping and withdrawal loop four or five times before sufficient water flow and pressure are built up in the loop for the water withdrawn from return line 26 through pressure detection line 89 to have sufficient pressure to begin opening the water flow regulator 87 to deliver water to the filter tank 88. When flow regulator 87 opens, water can be delivered through delivery line 86 as demanded by the user. During service demands with the pump running and the regulator open, approximately 7 gpm of water would pass through delivery line 86, 20 gpm of water would be pumped into the well under high pressure, and 27 gpm would be returned from the well to the aeration and precipitation tank 27.

As the water cycles in the loop both before and after regulator 87 opens, the water is repeatedly exposed to excess air resulting in oxidation of the contaminants in a high pressure water stream. This results in substantially all of the contaminants being oxidized and formed into a slurry type consistency. The high pressure water with contaminant slurry entrained therein moves through the pump without damage and moves through the filter with improved filtering action due to substantially complete oxidation in a readily removable form. This filtration coupled with chemical feed intake if necessary operates to remove iron, manganese, sulfur and turbidity from the water while correcting pH, taste, odor and color of the water.

When the air pressure in the air head 67 of aeration and precipitation tank 27 reaches its upper normal operational limit, for example 60 psi, the pressure switch 70 on the aeration and precipitation tank cuts out to shut off pump 2. The aeration and precipitation tank 26 then operates like a conventional pressure tank to deliver water under pressure on demand to the user. The water pressure in the return line 26 and in the tank 27 are sufficient when the air in the aeration and precipitation tank is within its operational limits to hold the water flow regulator in a proportionately open position, with the spring in the water flow regulator being calibrated accordingly. When the air pressure in the aeration and precipitation tank reaches its lower limit, for example 40 psi, switch 70 cuts in to activate pump 2 to circulate water in the system loop and to deliver water to the user, on demand, until the upper air pressure limit of 60 psi is obtained in the aeration and precipitation tank. As described above, the pressure control has safety backup features in the case of malfunction to shut off the pump if the pressure in air head 67 reaches 30 psi or to vent the tank 27 if air head pressure reaches 70 psi.

SECOND EMBODIMENT

Turning now to FIGS. 7 through 10, the preferred second embodiment is illustrated using the same reference numerals for parts common with the first embodiment for ease of illustration and description.

Figure 7:
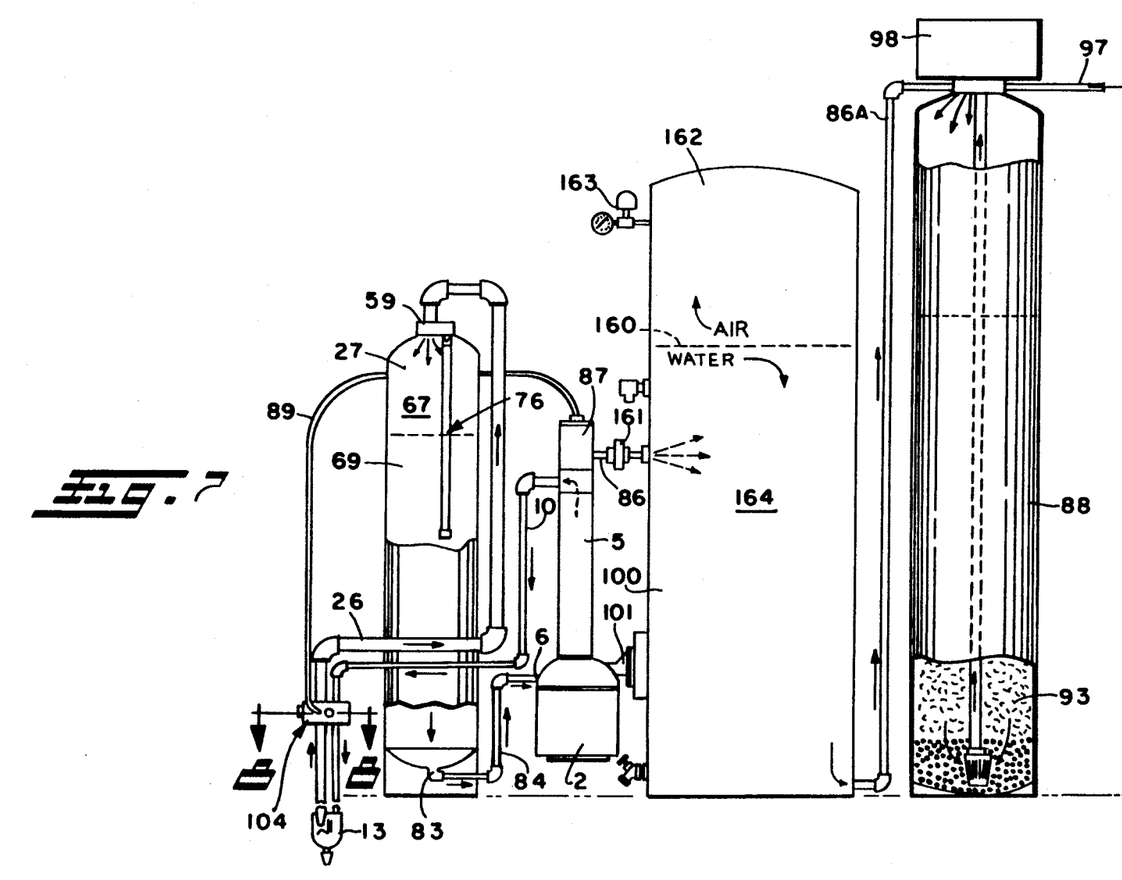
FIG. 7 is an elevation of the preferred embodiment partially broken away for clarity of illustration, with the arrows indicating water flow direction.

Pump 2 is mounted on the side of pressure tank 100 by bracket 101. Water is delivered under high pressure from the multi-stage pump end 5 through drive line 10 and the ejector 13. The system water and the water withdrawn from the well are then forced under pressure upwardly through water return line 26 to aeration and precipitation tank 27. The water then passes through manifold 59 and is sprayed into the air head 67 of aeration and precipitation tank 27. Excess air and gases can be vented from air head 67 by float valve assembly 76. The water sprayed into tank 27 forms water column 69.

The water in column 69 in the aeration and precipitation tank 27 passes from its bottom outlet 83 through inlet line 84 to the intake port 6 of pump 2. The aeration and precipitation tank 27 preferrably does not have rocks contained in the bottom thereof, although precipitation layer rocks may be used in certain water conditions as illustrated by the rocks 102 in the aeration and precipitation tank 27 of FIG. 1.

During pump operation, the water continuously cycles through the pumping and withdrawal loop consisting of pump 2, drive line 10, ejector 13, return line 26, aeration and precipitation tank 27, inlet line 84 and air mixing manifold 104. The air mixing manifold 104 is operative to entrain air into the water during the entire pumping cycle.

Figure 8:
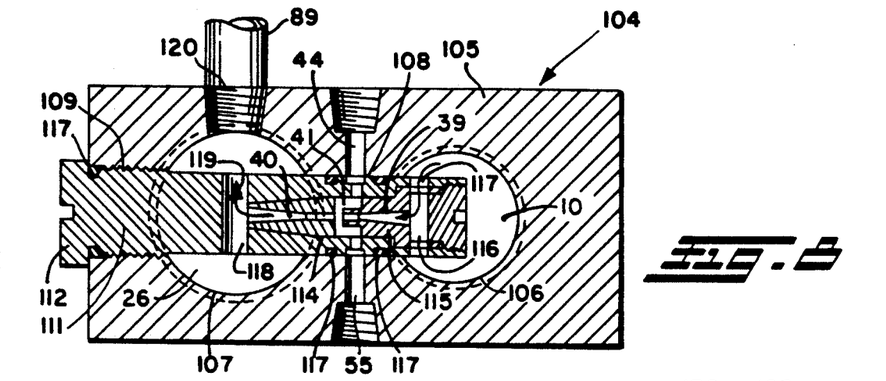
FIG. 8 is a cross section taken along the plane 8—8 of FIG. 7 showing another embodiment of an air mixing manifold assembly.

As best shown in FIG. 8, the air manifold assembly 104 in the preferred embodiment includes a body 105 having parallel bores 106 and 107 passing therethrough. Bore 106 is fluidically coupled to water drive line 10, and the second bore 107 is fluidically coupled to water return line 26. A third bore 108 is at right angles to first and second bores 106 and 107 and interconnects the same. A fourth bore 109 is at right angles to the first bore 106 and extends from the outer side of the assembly body 105 to the first bore 106. Fourth bore 109 is co-axial with the third bore 108. The fourth bore 109 is threaded to receive threaded shank 111 of insert 112.

Shank 111 of insert 112 at its forward end is provided with a stepped bore 114 threadedly to receive a venturi nozzle unit 115. The one piece venturi nozzle unit 115 has a converging nozzle section 39, throat 41 and diverging nozzle section 40, as generally described above. The water enters the venturi nozzle unit 115 from drive line 10 via entrance channel 116 in insert 112 as schematically illustrated by arrows 117. The water leaves the venturi nozzle unit 115 by exit channel 118 to enter return line 26, as indicated by arrow 119.

The venturi suction effect at throat 41 cooperates with the air intake 44 and chemical intake 55, if used, to entrain air and chemicals in the water passing through venturi unit 115. The shank 111 of insert 112 has a plurality of axially spaced, O-ring seals 117 therealong to seal insert 112 to body 105 to make the air intake manifold assembly 104 water tight. For maintenance purposes, insert 112 can be readily removed by screwing the same out of body 105. The venturi nozzle unit 115 can then be screwed out of insert 112 for total disassembly and maintenance.

The second bore 107 may also be provided with a threaded port 120. A pressure detection line 89 is coupled to port 120 and extends to the water flow control regulator 87 mounted on the top of the submersible pump end 5.

Figures 9, 10:
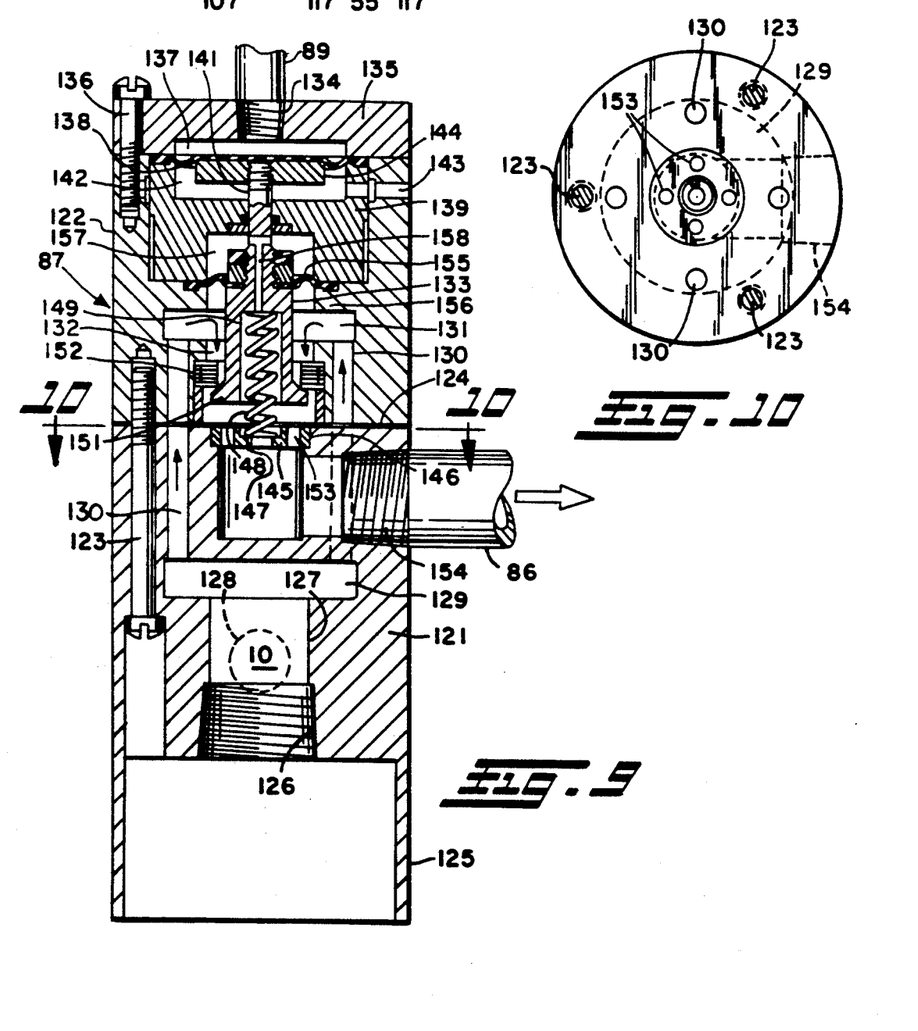
FIG. 9 is a vertical cross section through the water flow regulator mounted on the top of the submersible pump end of FIG. 7.
FIG. 10 is a horizontal cross section of the water flow regulator on the plane 10—10 in FIG. 9 showing the water circulation porting.

As best shown in FIG. 9, the water flow control regulator 87 includes lower body 121 and upper body 122 threadedly secured together by fasteners 123, with a sealing gasket 124 positioned therebetween. The lower body 121 has a skirt 125 fitting over and cooperating with multi-stage pump end 5. Water leaving the pump end 5 under high pressure passes through pump port 126 into bore 127. Bore 127 has an orifice 128 in its wall coupled to water drive line 10. The high pressure water is thus free to enter drive line 10. A portion of the water may also divide and pass upwardly through bore 127 to lower water manifold 129 communicating with four equally circumferentially spaced conduits 130 leading to upper water manifold 131. Upper water manifold 131 is in fluid communication with water flow channel 132 passing through the flow control regulator. The water flow channel 132 has a movable valve stem 133 therein controlling the flow therethrough depending upon the relative pressure in water pressure detection line 89.

The water pressure detection line 89 is coupled to minitoring port 134 in end cap 135 mounted on upper regulator body 122 by fasteners 136. Monitoring port 135 leads to pressure detection compartment 137. One wall of the pressure detection compartment 137 consists of a regulating diaphragm 138 marginally clamped between end cap 135 and diaphragm clamping spacer 139 received in a complementary recess in upper body 122. The under or backside of regulating diaphragm 138 is connected to an extension 141 on valve stem 133 by an adjustable stop block 144. A recess 142 with vent 143 is behind the regulating diaphragm 138 so that the pressure in pressure detection compartment 137 only acts against the bias on the other end of valve stem 133.

To this end, a discharge plate 145 is received in annular seat 146 in lower body 121. The discharge plate 145 has a central stop shoulder 147 to mount one end of spring 148. The other end of spring 148 is received in a socket 149 in valve stem body 133. The bias of spring 148 is opposed to and acts against the hydraulic pressure on the balancing diaphragm 138, with the greater pressure controlling the position of the valve stem 133 relative to its closed and open positions.

The valve stem 133 has a frusto-conical head 151 at its lower end, which head selectively cooperates with valve seat 152 in the water flow channel 131 to block or control the flow of water through water flow channel 132. When the frusto conical head 151 of valve stem 132 is in its closed position against valve seat 152 as illustrated in FIG. 9, water flow through the channel 131 is blocked, and the water in bore 126 can only move through water drive line 10. When the water pressure in pressure detection chamber 137 exceeds the spring force of spring 148, the head 151 of valve stem 132 moves away from valve seat 152 to permit flow through the water channel 132. The water then passes through circumferentially spaced holes 153 in discharge plate 145 into the water delivery port 154 coupled to water delivery line 86. The water pressure in the water flow channel 132 is balanced to eliminate or minimize its effect on valve stem 133, so that valve stem movement is controlled by the relative magnitude of the hydraulic pressure in pressure detection chamber 137 compared to the force of spring 148.

To this end, a balancing diaphragm 155 is clamped between the lower end of spacer 139 and a shoulder 156 on upper regulator body 122. The radially inner portion of balancing diaphragm 155 is mounted on the valve stem 132. The diaphragm 155 and spacer 139 cooperatively define a balancing chamber 157. The balancing chamber 157 may be in fluidic communication with the water flow channel 132 through socket 149 and T-bore 158 in valve stem body 132.

When the water flow channel 132 is closed by head 151 being seated on valve seat 152, the area of balancing diaphragm 155 exposed to water in the water channel 132 equals the area of the valve head exposed to water in the water flow channel 132. Therefore, the water pressure in flow control channel 131 acting upwardly against the diaphragm 155 is balanced by the force of the water acting downwardly on the valve head 151. This balancing results in the movement of valve stem 133 being exclusively controlled by the relative force between pressure detection chamber 137 and spring 148.

When the hydraulic pressure in detection chamber 137 acting on the regulating diaphragm 139 exceeds the force of spring 138, the valve stem 133 begins to move downwardly resulting in valve stem head 151 moving away from seat 152. Water passing through valve seat 152 can then pass upwardly through socket 149 and T-bore 158 into balancing chamber 157. Thereafter, the water pressure in balancing chamber 157 on one side of balancing diaphram 155 equals the water pressure in the water flow channel 132 on the other side of balancing chamber 157, thereby to negate or minimize any effect of the water pressure in water flow channel 131.

Therefore, substantially the only forces acting on the valve stem 132 while in its closed or open positions is the relative magnitude of the hydraulic pressure in pressure detection compartment 137 versus the force of spring 148. Thus as the water pressure in the pumping loop, as exemplified by a sample from return line 26, reaches a selected minimum control magnitude exceeding the spring force, the valve stem body 133 will begin to move downwardly to open the valve and allow flow therethrough to water delivery line 86 leading to pressure tank 100. After the sample water pressure equals or exceeds an upper pressure, for example 8 psi, the valve stem will be held in its fully open position which is limited by the stop block 144 engaging clamping spacer 139. The fully open position can be selectively varied by changing the position of the stop block 144 relative to the extension 141, thereby to change the stroke travel of valve stem 133 in accordance with service delivery requirements.

As best illustrated in FIG. 7, the water delivery line 86 is preferrably coupled to pressure tank 100 below the water level 160 in the tank. Delivery line 86 is provided with one or more check valves 161 to preclude water flowing backwardly from the tank 100 through the delivery line 86. Although an air to water pressure tank is illustrated and described, any type of pressure tank could be matched to the system, including but not being limited to, bladder and diaphragm pressure tanks.

The air pressure in air head 162 is used to control operation of the pump 2 in conventional fashion. To this end, a pressure switch 163 is connected to tank 100 and operates in the same manner as pressure switch 70 described in the context of the FIG. 1 embodiment. On demand, water passes from the pressure tank 100 through line 86A, the filter tank 88 and then to the user under the pressure of air head 162, as described above.

The operation of the embodiment of FIG. 7 is generally the same as the operation of the embodiment of FIG. 1 except that the air pressure head 162 in pressure tank 100 controls water delivery to the user rather than the air pressure head in the aeration and precipitation tank 27 as in FIG. 1. However, the following operational statement is provided for purposes of completeness.

During installation of the FIG. 7 system, the pressure tank 100 is precharged with compressed air at 38 psi or 2 psi less than switch cut in pressure. The pump 2, aeration and precipitation tank 27, pressure tank 100, air inlet manifold 104 and filter tank 88 are normally installed in a pump house or basement for ease of installation and maintenance.

After installation, flow control regulator 87 is held in its closed position by spring 148. The pump 2 is then primed and actuated. High pressure water is then repeatedly cycled through the pumping and withdrawal loop to begin withdrawing well water, to build up water pressure and flow rates in the loop and to entrain air into the water in excess quantities to initiate contaminant oxidation. Because of repeated cycling under high pressures, the oxidated contaminants are believed to enter a slurry type form in the water, which contaminants can be substantially removed by the filter 88 before service delivery without adversely affecting system equipment and without adversely affecting the quality of the water delivered. Since the air head 162 in the aeration and precipitation tank is not acting as the system pressure, the pressure in air head 162 can be substantially less, for example 10 psi. This results in more efficient pumping and water withdrawal than in the first embodiment since the pump in the loop is effectively pumping against a 10 psi air head instead of a 40-60 psi air head.

When the water in the loop on its return side reaches a predetermined minimum control level, for example, approximately 7 psi, the sampled water passing through detection line 89 will act against the regulating diaphragm 138 to overcome the force of spring 148 to begin moving valve stem 133 downwardly to open the valve. Pressurized water then passes through regulator 87 into pressure tank 100. When sufficient pressurized water has entered pressure tank 100, the water will pass upwardly through delivery line 86A for passage through the media bed 93 in filter tank 88. Water may then be delivered to service on demand as indicated by arrow 97 provided sufficient air pressure exists in the air head 162 of pressure tank 100.

To this end, the pump 2 will continue operating to cycle water in the pumping and withdrawal loop and to deliver some water to the pressure tank until a selected air pressure is obtained in air head 162 of pressure tank 100. For example, when the air pressure in head 162 reaches 60 psi, the switch 163 will shut off pump 2 and a water column reservoir 164 under pressure will be present in tank 100. Thereafter, water can be delivered to service on demand under the air pressure head 162 of the pressure tank 100.

After repeated service use demands, the water reservoir column 164 is reduced and the pressure in air head 162 decreases. When the air pressure in head 162 reaches the lower operational limit, for example 40 psi, switch 163 senses this pressure, cuts in and reactivates pump 2. Pump 2 then cycles the water through the pumping and withdrawal loop until the hydraulic pressure on the return side of the loop equals or exceeds the minimum control pressure. Thereafter, regulator 87 opens to allow some of the water to be pumped into pressure tank 100 to replenish the reservoir and/or to meet service demands.

RETROFIT EMBODIMENT

Figure 11:
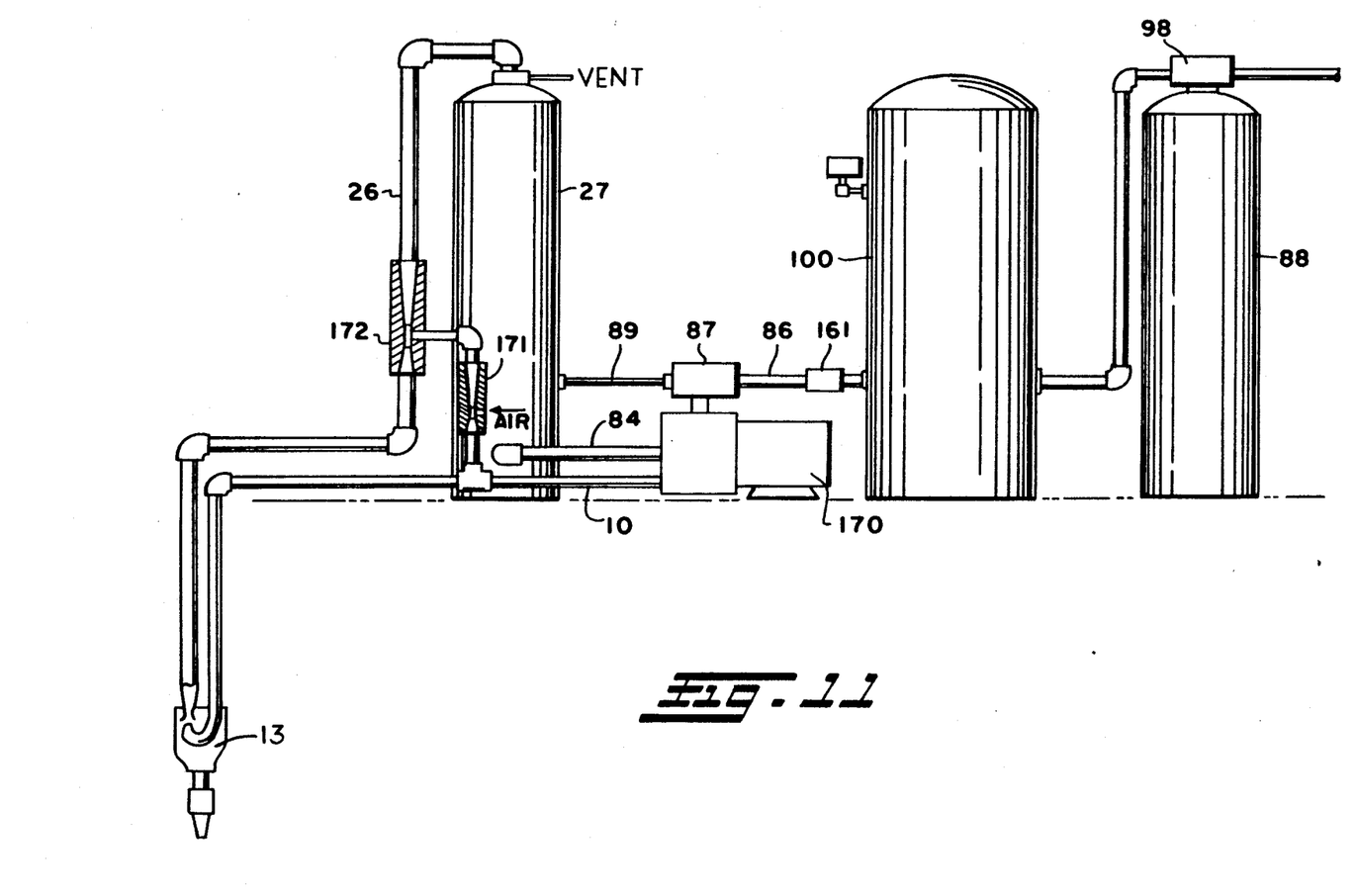
FIG. 11 is an elevation of the well water removal and treatment system of the present invention retrofit into an existing jet pump well system.

The well water removal and treatment system of the present invention may also be retrofit into existing jet pump systems as illustrated in FIG. 11. In FIG. 11, structural elements common to the other embodiments carry the same reference numerals for ease of description and illustration.

An existing jet pump system will normally include a jet pump 170, a pressure tank 100 and a filter tank 88.

A new aeration and precipitation tank 27 will be inserted into the system, and the system will be replumbed to accomodate the aeration and precipitation tank 27. To this end, a venturi nozzle air intake manifold 171 is inserted in a line between a drive line 10 and a water return line 26 to entrain air into the water. A venturi 172 can be used in return line 26 to further increase the pressure differential between the drive and return lines when operating with a low pressure pump. The water with entrained air leaving venturi nozzle manifold 171 enters return line 26 at the throat of venturi 172, as illustrated in FIG. 11.

A pump inlet line 84 can be installed between the lower end of the aeration and precipitation tank 27 and the intake for jet pump 170. A flow control regulator 87 can be mounted on the jet pump 170 and is hydraulically controlled by a pressure detection line 89 leading from aeration and precipitation tank 27 to the flow control regulator 87. In this instance, it is most convenient from a piping standpoint to sample the loop water on its return side from the immediately adjacent aeration and precipitation tank 27. The water delivery line 86 and check valve 161 are then inserted between the flow control regulator 87 and the pressure tank 100 to complete the retrofitting of the existing jet pump system. The operation of well water removal and treatment system as retrofit into the existing jet pump system is the same as described above.

It will be apparent from the foregoing that changes may be made in the details of construction and configuration without departing from the spirit of the invention as defined in the following claims. For example, systems can be designed for specific wells with the structural components matched for enhanced operational efficiency. Systems can be readily varied to deliver 3 to 14 gallons per minute service delivery. For larger capacity systems, the filtration tank diameter is increased, two filtration tanks in parallel can be used and/or larger pumps can be employed.

We claim:

1. A well water removal and treatment system comprising tank means having a water column and a pressurized air head and further having an inlet and outlet for water passing therethrough, above ground pump means having a water intake and pressurized water outlet to pump the water in the system, a water inlet line from said tank means outlet to the water intake of the pump means, a pressurized water drive line leading from the pump outlet to a well water ejector, a water return line leading from the well water ejector to the tank means inlet to spray the system water and the water withdrawn from the well through the tank means inlet into the air head of the tank means, a mixing manifold means fluidically connected between the water drive line and the water return line to entrain air into the water in the system during pump operation and means selectively to deliver the water from the system to service.

2. The well water removal and treatment system of claim 1 wherein the mixing manifold means includes a venturi nozzle and an air inlet port to introduce air into the water adjacent the venturi nozzle during the entire pump cycle to mix air into the water to enhance contaminant oxidation in the water being delivered to the tank means.

3. The well water removal and treatment system of claim 2 wherein the above ground pump means includes a pump motor, an adaptor manifold and a multi-stage pump end to create relatively high water pressures at the pump outlet.

4. The well water removal and treatment system of claim 3 wherein the mixing manifold means includes at least one normally closed opening in the water drive line or in the water return line in straight line alignment with the venturi nozzle selectively to permit maintenance or assembly on the venturi nozzle by uncovering the at least one normally closed opening.

5. The well water removal and treatment system of claim 4 wherein the mixing means includes a normally closed opening in both the water drive and water return lines, a pressure gauge normally mounted in each opening in the water drive line and water return line respectively to close the openings and permit the water pressure differential across the mixing means to be monitored.

6. The well water removal and treatment system of claim 4 wherein the mixing manifold means includes a body having a first bore therein through which the water drive line passes, a second bore therein through which the water return line passes, and a third bore therein at generally right angles to and communicating with the first and second bores, said third bore receiving an insert with a passage therethrough for receiving the venturi nozzle therein.

7. The well water removal and treatment system of claim 6 wherein the passage through the insert has female threads thereon to cooperate with male threads on the venturi nozzle removably to mount the venturi nozzle in the insert.

8. The well water removal and treatment system of claim 7 wherein the venturi nozzle has a first component with a diverging passage and a second component with a converging passage, with the two components being threadably mounted to and spacially separated in the insert passage.

9. The well water removal and treatment system of claim 8 wherein the insert has an annular groove on its periphery and an inlet extending between the annular groove and the insert passage in the space between the first and second components of the venturi nozzle.

10. The well water removal and treatment system of claim 9 wherein the body includes a fourth bore extending between an air inlet and the annular groove on the insert to introduce air into the water under a suction effect created by the venturi nozzle and pressure differential.

11. The well water removal and treatment system of claim 10 wherein the body means includes at least a fifth bore extending to the annular groove on the insert selectively to introduce water treatment chemicals into the water, as required by the condition of the well water being treated.

12. The well water removal and treatment system of claim 2 wherein the mixing manifold means further includes additional port means selectively to introduce water treatment chemicals into the water adjacent the venturi nozzle to mix the water treatment chemicals into the water, the water treatment chemicals being selected if and as required by the condition of the water being treated.

13. The well water removal and treatment system of claim 2 wherein the tank means includes an aeration and precipitation tank having inlet means to spray pressurized air laden water into an air space in the aeration precipitation tank.

14. The well water removal and treatment system of claim 13 further including means to control pump operation based upon the pressure in the air space of the aeration and precipitation tank to allow the aeration and precipitation tank to act as the pneumatic pressure control for the system and for water delivery to service.

15. The well water removal and treatment system of claim 14 wherein the means to control includes a pressure switch operative to maintain the air pressure in the air space of the aeration and precipitation tank within a preselected pressure range by energizing the pump means when the actual pressure in the air space approaches the lower end of the pressure range and by deenergizing the pump means when the actual pressure approaches the upper end of the pressure range.

16. The well water removal and treatment system of claim 15 wherein the means to control includes safety means to cut-off the pump if air space pressure decreases to a preselected low safety cut-off pressure and to vent the air space if the air space pressure reaches an upper preselected safety pressure.

17. The well water removal and treatment system of claim 16 wherein the means to control includes a pressure gauge for monitoring the actual pressure of the air space.

18. The well water removal and treatment system of claim 15 wherein the water return line is connected to the inlet means mounted on the top of the aeration precipitation tank, the inlet means including an intake manifold having two vertically spaced arrays of nozzles for spraying pressurized water into the air space.

19. The well water removal and treatment system of claim 14 wherein the aeration and precipitation tank has the inlet line to the pump intake emanating from the bottom thereof, and the means selectively to deliver includes a second outlet at the bottom thereof and a delivery line leading from the second outlet to a filter tank.

20. The well water removal and treatment system of claim 19 wherein the delivery line has a water flow regulator therein which controls the water flow in the delivery line in proportion to the return water pressure in a pumping and withdrawal loop.

21. The well water removal and treatment system of claim 20 including means for repeatedly circulating the water through a pumping and withdrawal loop, the loop including the pump, water drive line, ejector, water return line, air mixing manifold, aeration and precipitation tank and inlet line to the pump, the water circulating in the pumping and withdrawal loop until the water pressure on the side of the loop returning from the well exceeds a predetermined minimum control pressure allowing the water flow regulator to begin to open.

22. The well water removal and treatment system of claim 19 wherein the filter tank includes a filter media bed for treating the water selectively passing therethrough and a flow control valve periodically operative to backwash the filter bed in the filter tank.

23. The well water removal and treatment system of claim 22 wherein the water delivery line has a water flow regulator therein controlled by the water pressure in the loop return wherein the flow regulator begins to open after the minimum control pressure is obtained to allow a portion of the water in the loop to enter the pressure tank.

24. The well water removal and treatment system of claim 23 or 21 wherein the water flow regulator has a housing, first housing port coupled to a pressure detection line communicating with the return side of the loop, a second housing port coupled to the delivery line, a third housing port coupled to the downstream delivery line, water channel means extending between the second and third ports, and a movable valve stem in the channel means of the housing cooperating with a valve seat in the channel means to control the flow of water through the chamber means from the second port to the third port dependent upon the water pressure on the return side of the loop.

25. The well water removal and treatment system of claim 24 wherein the water flow regulator includes a regulating diaphragm in the housing connected adjacent the other end of the valve stem and a spring in the housing connected adjacent the other end of the valve stem, the pressurized water in the water detection line acting against the regulating diaphragm in opposition to the spring bias to control valve stem movement in accordance with the relative pressure magnitudes on the opposite ends of the valve stem.

26. The well water removal and treatment system of claim 25, wherein the spring is positioned to bias the valve stem toward a closed position on the valve seat and the regulating diaphragm is positioned so that water pressure in the water detection line biases the valve stem toward an open position off the valve seat when the water pressure on the regulating diaphragm exceeds the spring force.

27. The well water removal and treatment system of claim 26 wherein the regulator includes a balancing chamber separated from the channel means by a flexible balancing diaphragm.

28. The well water removal and treatment system of claim 27 wherein the valve stem includes a truncated conical valve head selectively cooperating with the valve seat and a balancing bore extending from the valve head through the valve stem to the balancing chamber, the pressure on the balancing diaphragm substantially equalling the pressure on the valve head when the valve is closed and the water pressure on opposite sides of the balancing diaphragm being substantially equal when the valve is open, whereby substantially the only forces acting on the valve stem in either valve position are water pressure against the regulating diaphragm and spring pressure against the valve body.

29. The well water removal and treatment system of claim 13 further including means in the aeration and precipitation tank inlet momentarily to vent the air space of any excess gases and air beyond that required for oxidation and pneumatic pressurization.

30. The well water removal and treatment system of claim 13 wherein the means selectively to deliver includes a water divider adjacent the pump outlet and a water delivery line communicating between the water divider and pressure tank, the pressurized water leaving the pump end under sufficient pressure and flow rates may divide in the divider for flow through the pressurized water drive line and for flow through the pressurized water delivery line leading to inlet means on the pressure tank.

31. The well water removal and treatment system of claim 24 including means for repeatedly circulating the water through a pumping and withdrawal loop, the loop including the pump, water drive line, ejector, water return line, air mixing manifold, aeration and precipitation tank and inlet line to the pump, the water circulating in the pumping and withdrawal loop until the water pressure on the side of the loop returning from the well exceeds a predetermined minimum control pressure.

32. The well water removal and treatment system of claim 2 wherein the well water ejector is positioned in the well and all other components of the system are positioned above ground.

33. The well water removal and treatment system of claim 32 wherein the well water ejector includes a U-shape conduit connecting the pressurized water drive line to the water return line, a venturi nozzle in the U-shape conduit and a water suction intake adjacent the venturi nozzle to draw water from the well into the water feed line.

34. The well water removal and treatment system of claim 2 wherein the well water ejector is above ground, a water withdrawal line runs from the well to the well water ejector and all other system components are above ground.

35. The well water removal and treatment system of claim 34 wherein the well water ejector includes a U-shape conduit connecting the water drive line to the water return line, and a venturi nozzle in the U-shape conduit, the water suction intake line leading to the venturi nozzle to permit water to be drawn from the well into the venturi nozzle for passage into the well water feed line.

36. The well water removal and treatment system of claim 2 wherein at least one additional venturi nozzle manifold having a throat inlet is positioned between the drive line and return line to draw water treatment chemicals as needed into the water moving through the at least one additional venturi nozzle manifold.

37. The well water removal and treatment system of claim 2 wherein a venturi is positioned in the return line and the air entrained water leaving the mixing manifold enters the return line at the venturi.

38. A well water removal and treatment system comprising an above ground pump having a water intake and pressurized water outlet, a well water ejector, an aeration and precipitation tank containing a pressurized air head and a column of water, a pressurized water drive line leading from the pump outlet to the well water ejector, a water return line leading from the well water ejector to the aeration and precipitation tank to spray water into the air head, a water inlet line from the aeration and precipitation tank to the pump intake, a water delivery line from the aeration and precipitation tank for selective delivery to service and a mixing means fluidically connected between the pressurized water drive line and water return line including a venturi nozzle to mix air into the water during the entire pump cycle.

39. A well water removal and treatment system comprising an above ground pump having a water intake and pressurized water outlet, a well water ejector, an aeration and precipitation tank containing a pressurized air head and column of water and having a water inlet and a water outlet, a pressure tank containing a pressurized air head and a column of water, the pressurized water outlet of the pump dividing into a pressurized water drive line leading to the well water ejector and into a water delivery line leading to the pressure tank, a water return line leading from the well water ejector to the inlet of the aeration and precipitation tank, a water inlet line from the aeration and precipitation tank outlet to the pump intake, a water service line from the pressure tank for selective delivery through a filter tank to service and a mixing means fluidically connected between the pressurized water drive line and the water return line and including a venturi nozzle manifold to mix air into the water during the entire pump cycle.

40. The well water removal and treatment system of claim 39 further including means to control pump operation based upon the air head pressure in the pressure tank to maintain the air head pressure within a selected range for pressure control of the system.

41. The well water removal and treatment system of claim 40 further including means to introduce at least one water treatment chemical into the water adjacent the venturi nozzle mixing manifold.

42. The well water removal and treatment system of claim 39 wherein the filter tank contains a filter media bed and a control valve periodically operative to automatically to backwash the filter media bed.

43. The well water removal and treatment system of claim 39 wherein the above ground pump includes a jet pump motor, an adaptor manifold having the pump intake therein and a multi-stage pump end receiving water from the pump manifold and pressurizing the water in its passage therethrough to the pump outlet.

44. The well water removal and treatment system of claim 39 further including a flow regulator in the water delivery line controlling the flow therethrough in proportion to the water pressure in the water return line.

45. The well water removal and treatment system of claim 44 further comprising a venturi in the return line with the air laden water leaving the venturi nozzle mixing manifold entering the return line at the venturi.

46. The well water removal and treatment system of claim 44 wherein the flow regulator includes a valve stem in the water delivery line progressively movable between an open and closed valve position, a regulating diaphragm connected to one end of the valve stem and biasing the valve stem under the pressure of water from the water return line toward the open valve position, a spring connected to the other end of the valve stem biasing the valve stem toward the closed valve position in opposition to the diaphragm and balancing means to minimize the effect of water pressure in the water delivery line on the valve stem, whereby valve stem movement is dependent upon the magnitude of water pressure on the diaphragm relative to the magnitude of the spring force.

47. A water flow regulator comprising a housing, a water flow channel through the housing, a movable valve stem cooperating with a valve seat in the water channel progressively to open or close the water flow channel in proportion to a relative magnitude of a variable control pressure, the valve stem having a head cooperating with the downstream side of the valve seat, biasing means in the housing urging the valve stem in one direction toward the closed position, the variable control pressure biasing the valve stem in the opposite direction and balancing means substantially to eliminate the water pressure in the water flow channel from acting on the valve stem, whereby valve stem movement is dependent upon the magnitude of the variable control pressure relative to the magnitude of the biasing means, said balancing means including a pressure chamber in the housing having a flexible balancing diaphragm extending between the stem and housing to form a partition between pressure chamber and water channel and further including a passageway extending between the head and pressure chamber, said balancing means being constructed such that the water pressure in the water flow channel acting on the flexible balancing diaphragm is balanced by the water pressure on the head when the head is closed, and said passageway being constructed to equalize the water pressure on opposite sides of the balancing diaphragm to negate any effect of the water pressure in said water flow channel when the head is open.

48. The water flow regulator of claim 47 further comprising a pressure detection compartment in the housing with a flexible regulating diaphragm forming one wall of the pressure detection compartment, the regulating diaphragm being connected to the valve stem.

49. The water flow regulator of claim 48 further comprising a first port in the housing leading to the pressure detection compartment to provide control fluid entry into the pressure detection compartment to engage the diaphragm thereby providing the control pressure acting on the valve stem.

50. The water flow regulator of claim 49 wherein the regulating diaphragm is backed by a vented recess so that pressure acts directly on the regulating diaphragm on its pressure detection chamber side.

51. The water flow regulator of claim 50 wherein a hydraulic pressure detection line leading from a water pumping system pressure line is coupled to the first port and a water delivery line from the water pumping system is coupled to the water flow channel, whereby the actual water pressure in the pumping system as exemplified by the water pressure in the hydraulic pressure detection line proportionately controls the flow rate in the water delivery line from the pumping system.

52. The water flow regulator of claim 47 wherein the biasing means is a spring engaging the head end of the valve stem.

53. A well water removal and treatment system comprising:
  a water circulation system including a pump, a venturi nozzle, a water intake port to the venturi nozzle, an aeration and precipitation tank and fluid lines interconnecting the same;
  means to entrain at least one chemical component into the water in the water circulation system during pump operation for treatment of the water;
  water transfer means for transferring water from a water supply into the circulation system through the water intake port into the venturi nozzle and then recirculated by the pump within the water circulation system including the fluid lines, pump, venturi nozzle and aeration and precipitation tank to build up and control water pressure within the water circulation system;

water delivery means leading from the water circulation system to a point of water delivery to a user; and means to control water flow through the water delivery means in proportion to pressure levels attained in the water circulation system.

54. The well water removal and treatment system of claim 53 wherein the means to entrain is positioned in the water circulation system and is entraining air.

55. The well water removal and treatment system of claim 54 wherein the means to entrain also entrains water treatment chemicals into the water.

56. The well water removal and treatment system of claim 53 wherein the water delivery means includes a filter tank.

57. The well water removal and treatment system of claim 56 wherein the water delivery means further includes a pressure tank.

58. The well water removal and treatment system claim 53 wherein the means to control is a pressure regulator in the water delivery means sensing the water pressure in the water circulation means downstream of both the water intake port and means to entrain and upstream of the water delivery means leading from the water circulation system.

59. The well water removal and treatment system of claim 53 wherein the aeration and precipitation tank includes a water column and an air head and the means to control is a pressure regulator in the water delivery means sensing the water pressure in the water column of the aeration and precipitation tank.

* * * * *

UNITED STATES PATENT AND TRADEMARK OFFICE
CERTIFICATE OF CORRECTION

PATENT NO. : 5,147,530

DATED : September 15, 1992

INVENTOR(S) : James W. Chandler; William D. Chandler, Jr.; William J. Conery

It is certified that error appears in the above-identified patent and that said Letters Patent is hereby corrected as shown below:

Column 19, line 44 "claim 25, wherein" change to --claim 25 wherein--

Column 21, line 4 "means fludically connected" change to --means fluidically connected--

Column 21, lines 38 and 39 "to automatically to backwash" change to --to automatically backwash--

Signed and Sealed this

Twenty-eighth Day of September, 1993

Attest:

BRUCE LEHMAN

*Attesting Officer*          *Commissioner of Patents and Trademarks*